(12) United States Patent
Adachi

(10) Patent No.: US 6,508,686 B2
(45) Date of Patent: *Jan. 21, 2003

(54) METHOD OF MANUFACTURING PIXEL ELECTRODE FOR REFLECTION TYPE DISPLAY DEVICE

(75) Inventor: Hiroki Adachi, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/870,868

(22) Filed: May 30, 2001

(65) Prior Publication Data

US 2001/0029144 A1 Oct. 11, 2001

Related U.S. Application Data

(63) Continuation of application No. 09/469,984, filed on Dec. 21, 1999, now Pat. No. 6,243,153, which is a continuation of application No. 08/951,954, filed on Oct. 17, 1997, now Pat. No. 6,056,614.

(30) Foreign Application Priority Data

Nov. 6, 1996 (JP) .............................................. 8-310032

(51) Int. Cl.[7] .............................................. H05B 33/10
(52) U.S. Cl. .......................... 445/24; 314/113; 349/139
(58) Field of Search .......................... 445/24; 314/113; 349/139

(56) References Cited

U.S. PATENT DOCUMENTS

| | | | | |
|---|---|---|---|---|
| 4,431,272 A | * | 2/1984 | Yazawa et al. | 349/113 |
| 4,648,691 A | * | 3/1987 | Oguchi et al. | 349/113 |
| 5,193,017 A | | 3/1993 | Iwai et al. | 359/59 |
| 5,579,142 A | | 11/1996 | Sawayama et al. | 359/102 |
| 5,708,486 A | | 1/1998 | Miyawaki et al. | 341/44 |
| 5,736,267 A | * | 4/1998 | Mitsui et al. | 428/702 |
| 5,917,563 A | | 6/1999 | Matsishima | 349/38 |
| 5,940,154 A | | 8/1999 | Ukita et al. | 349/113 |
| 5,986,723 A | | 11/1999 | Nakamura et al. | 349/39 |
| 6,018,379 A | | 1/2000 | Mizobata et al. | 349/112 |
| 6,056,614 A | * | 5/2000 | Adachi | 349/113 |
| 6,072,454 A | * | 6/2000 | Natai et al. | 349/41 |
| 6,088,070 A | * | 7/2000 | Ohtani et al. | 349/44 |

* cited by examiner

Primary Examiner—Kenneth J. Ramsey
(74) Attorney, Agent, or Firm—Fish & Richardson P.C.

(57) ABSTRACT

A process of a pixel electrode of a direct-sight type of reflection type liquid-crystal display device is simplified. A pixel electrode 120 of a reflection type liquid-crystal display device is formed of an aluminum film which is formed by sputtering. In forming the aluminum film, moisture is intentionally contained in atmosphere, and also a sample is heated. With this process, aluminum grains grow so that irregularities of $\mu m$ order is formed on the surface of the aluminum film. The aluminum film thus formed allows the incident light to be irregularly reflected so that it is in a visually white muddy state. This is suitable to the pixel electrode for the reflection type liquid-crystal display device.

28 Claims, 3 Drawing Sheets

METHOD OF MANUFACTURING PIXEL ELECTRODE FOR REFLECTION TYPE DISPLAY DEVICE

This is a continuation of U.S. application Ser. No. 09/469,984, filed Dec. 21, 1999, (now U.S. Pat. No. 6,243, 153), which is a continuation of Ser. No. 08/951,954, filed Oct. 17, 1997 (now U.S. Pat. No. 6,056,614).

BACKGROUND OF THE INVENTION

1. Field of the Invention

The present invention relates to a technique for forming an electrode used for a pixel electrode of a reflection type liquid-crystal display, and more particularly to a method of manufacturing a pixel electrode for a direct-sight type of reflection type liquid-crystal display.

2. Description of the Related Art

The reflection type liquid-crystal display has a function of conducting display with the combination of reflection of a light inputted from the exterior by a pixel electrode with optical modulation action of liquid crystal.

The reflection type liquid-crystal display is roughly classified into a direct sight type and a projection type. In the direct sight type, the pixel electrode is required to irregularly reflect a light to be reflected by the electrode so that it is seen that the reflected light is white-muddy. On the other hand, in the projection type, the pixel electrode is required to be finished into a mirror surface.

In the reflection type liquid-crystal display device, either of a state in which an incident light is reflected by the pixel electrode and outputted to the exterior of the device, or a state in which the incident light is not outputted to the exterior of the device is selectively obtained in each cell by utilizing the optical modulation action of the liquid crystal, thereby conducting a bright or dark display in each cell, and images are displayed in combination with the bright cells and dark cells.

In the direct-sight type liquid-crystal display, the incident light from the exterior is reflected by the pixel electrode and then outputted to the exterior of the device, i.e., which is the bright display. However, since the display is obtained by reflecting the incident light by the pixel electrode as is reflected by a mirror without any changes, there occurs such a phenomenon that the display is glittered or darkened depending on an angle of view. That is, there occurs a phenomenon that the angle of view is narrowed.

This is caused by a fact that the reflection state of the incident light is different according to the angle of view. In order to eliminate this problem, the pixel electrode needs to be devised so that the incident light is irregularly reflected. With the device that allows irregular reflection, the pixel electrode appears to be in a visually white muddy state (it is needless to say that in the case where special processing is conducted on the pixel electrode so that only a light of a specific wavelength is inputted to the pixel electrode, the pixel electrode is not always white-muddy).

In general, in a direct-sight type display device, the surface of a pixel electrode is subjected to light etching to form irregularities thereon, to thereby cause the above-mentioned irregular reflection.

It is a supreme demand to suppress the manufacture costs as much as possible for the direct-sight type of reflection type liquid-crystal display. This is because that since the direct-sight type of reflection type liquid-crystal display device requires no back light which is different from the transmission type, it facilitates a low power consumption and a weight-lighting. As a result, the direct-sight type of reflection type liquid crystal display is mainly used for a cheap display unit of an information processing terminal or a portable telephone.

Under the above circumstances, an important problem resides in reducing its manufacturing process as much as possible to suppress the production costs as much as possible.

A process of forming irregularities on the surface of the above pixel electrode through etching is so complicated that wet etching or dry etching is required in a final stage.

In particular, since this etching is conducted after most of the device is completed, the use of wet etching suffers from a problem that etchant enters the interior of the device. Also, the use of dry etching suffers from electrostatic breakdown, etc., which are caused by the application of a bias voltage. In particular, the structure of the active matrix type is employed, those problems become more serious.

In order to evade those problems, such a trouble-some labor as making a process management standard more strict is required. However, this makes the manufacture costs increase.

SUMMARY OF THE INVENTION

The present invention has been made in view of the above problems, and therefore an object of the present invention is to provide a means for obtaining a structure where an incident light is irregularly reflected on the surface of a pixel electrode through a simpler method.

In order to solve the above problems, according to one aspect of the present invention, there is provided a method of manufacturing a pixel electrode for a reflection type display device having a structure in which an incident light is reflected, characterized by comprising the steps of:

forming grains on the surface of a film made of aluminum or mainly contains aluminum when forming the film; and forming a surface from which the incident light is irregularly reflected.

According to another aspect of the present invention, there is provided a method of manufacturing a pixel electrode for a reflection type display device having a structure in which an incident light is reflected, characterized by comprising the steps of:

forming a film made of aluminum or mainly contains aluminum through sputtering in which moisture is intentionally introduced; and forming a surface from which the incident light is irregularly reflected on the surface of the film.

According to still another aspect of the present invention, there is provided a method of manufacturing a pixel electrode for a reflection type display device having a structure in which an incident light is reflected, characterized by comprising the steps of:

forming on a substrate having a heated insulating surface a film made of aluminum or mainly contains aluminum through sputtering in which moisture is intentionally introduced;

depositing aluminum grains simultaneously with the formation of the film, on the surface of the film made of aluminum or mainly contains aluminum; and forming the surface from which the incident light is irregularly reflected on the surface of the film.

According to yet still another aspect of the present invention, there is provided a method of manufacturing a pixel electrode for a reflection type display device having a structure in which an incident light is reflected, wherein the pixel electrode is made of aluminum or mainly contains aluminum, the method characterized by comprising the steps of:

when forming the pixel electrode made of aluminum or mainly contains aluminum, heating a substrate and sputtering the pixel electrode in which moisture is intentionally introduced; and forming a film made of aluminum or mainly contains aluminum having a surface by which the incident light is irregularly reflected.

According to yet still another aspect of the present invention, there is provided a method of manufacturing a pixel electrode for a reflection type display device having a structure in which an incident light is reflected, wherein the pixel electrode is made of aluminum or mainly contains aluminum, the method characterized by comprising the steps of:

when forming the pixel electrode made of aluminum or mainly contains aluminum, heating a substrate and sputtering the pixel electrode in which moisture is intentionally introduced;

depositing aluminum grains simultaneously with the formation of the pixel electrode, on the surface of a film mad of aluminum or mainly contains aluminum; and forming a film made of aluminum or mainly contains aluminum having a surface by which the incident light is irregularly reflected.

DETAILED DESCRIPTION OF THE PREFERRED EMBODIMENTS

Figure 2:
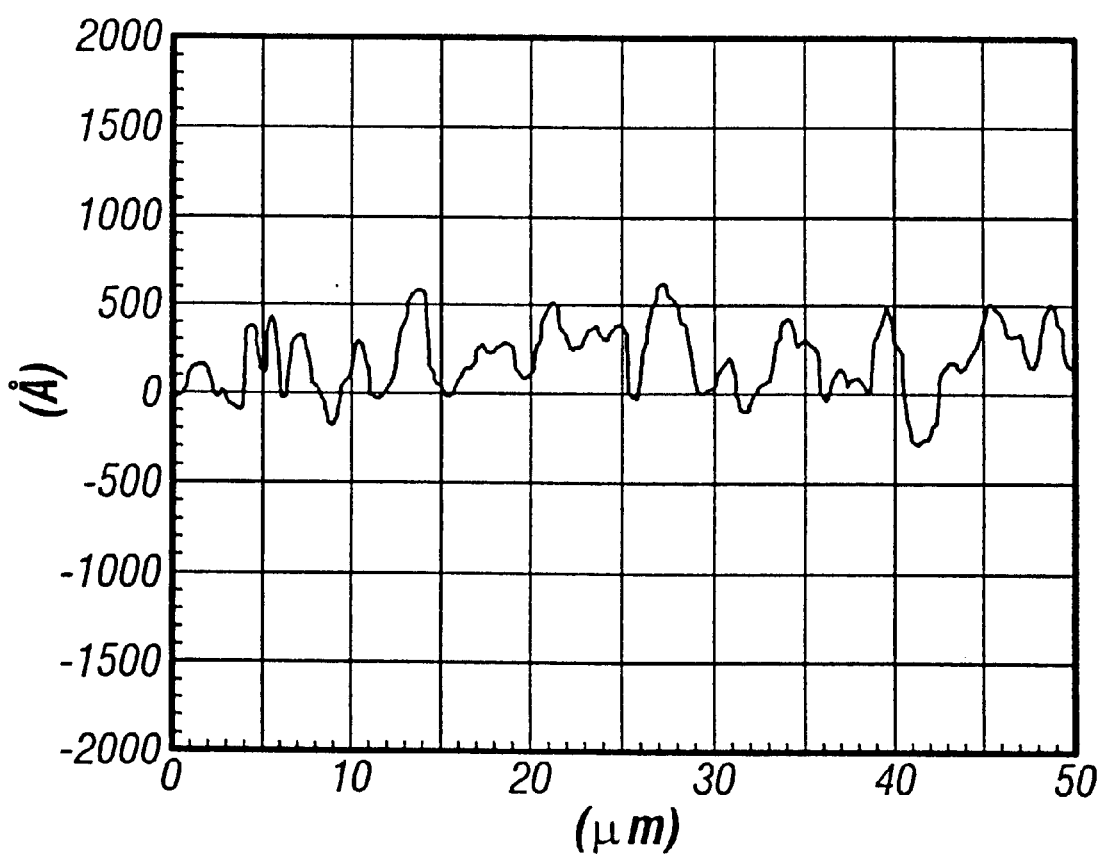
FIG. 2 is a graph representing data of measured irregularities of the surface of an aluminum film as obtained in the first embodiment.

A pixel electrode for a reflection type liquid-crystal display device is manufactured using a material made of aluminum or mainly containing aluminum by sputtering. At this time, moisture is contained in an atmosphere. Preferably, a substrate (base substance) is heated. With this process, aluminum grains (having a grain diameter of nearly several $\mu$m or less) are deposited, and the surface of an aluminum film as obtained has irregularities as shown in FIG. 2.

This film enables intentional introduction of moisture to be readily executed during the normal sputtering process.

Also, the diameter of the deposited aluminum grain and the deposition state can be controlled according to the introduced amount of moisture or a heat temperature.

The aluminum film thus obtained allows an incident light to be irregularly reflected, thereby being capable of obtaining a visually white-muddy state. Such films described above is suitable for the pixel electrode for the reflection type liquid-crystal display device.

The simplest method of introducing moisture is a method in which moisture is introduced in an atmosphere. In particular, as one of the simplest method, there is a method of introducing moisture using air. Also, there can be applied a method of containing moisture in a target.

It is considered that the action of moisture promotes the formation of grains because oxygen exists in the deposition of the aluminum film, so that the deposition of grains is progressed. Also, heating has an effect to promote the growth of grains.

The specific condition may be that air of about 0.1 to 5% is mixed with the sputtering atmosphere if air is used, for example, for introduction of moisture.

Also, the temperature of heating may be selected from about 100 to 300° C.

It should be noted that a material for forming an electrode may be a material containing impurities or a material made of an alloy consisting of aluminum and other metal material, other than the material purely containing aluminum.

First Embodiment

A first embodiment is directed to a process of manufacturing a reflection type active matrix liquid-crystal display device. FIGS. 1A to 1D are diagrams showing the process of manufacturing a reflection type active matrix liquid-crystal display unit according to this embodiment.

First, a silicon oxide film 102 is formed in thickness of 3000 Å on a glass substrate 101 as a base film by the plasma CVD method or the sputtering method.

Then, an amorphous silicon film not shown is formed on the silicon oxide film 102, and also a laser light is irradiated onto the amorphous silicon such that the amorphous silicon film is changed into a crystalline silicon film. The crystalline silicon film thus obtained is patterned to obtain an active layer 103.

Figure 1A:
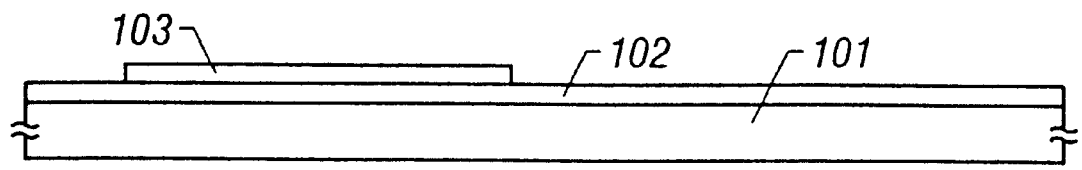
FIGS. 1A to 1D are diagrams partially showing a process of manufacturing a reflection type active matrix liquid-crystal display unit of the first embodiment.

Thus, a state shown in FIG. 1A is obtained. Subsequently, an aluminum film not shown for formation of a gate electrode is formed in thickness of 4000 Å on the active layer 103 by the sputtering method. Then, a silicon nitride film 106 is formed in thickness of 1000 Å on the aluminum film by the plasma CVD method.

Figure 1B:
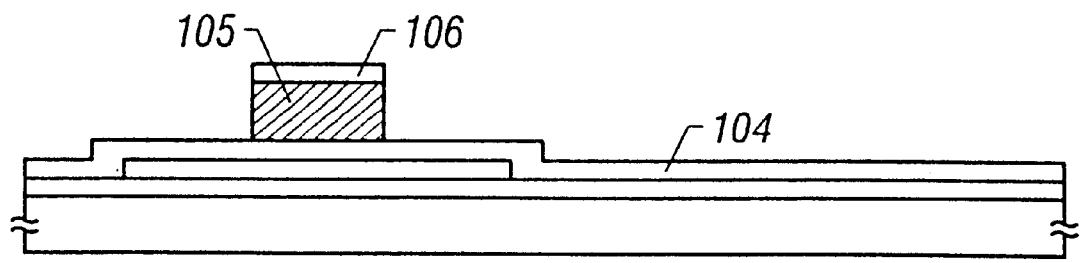

Thus, a state shown in FIG. 1B is obtained. Subsequently, an anodic oxide 108 is formed on side surfaces of the aluminum pattern through the anodic oxidation. In this process, an electrolyte comes in contact with only the side surfaces of the aluminum pattern due to the existence of the silicon nitride film 106 so that the anodic oxide 108 selectively grows in a-direction of the side surfaces of the aluminum pattern.

Figure 1C:
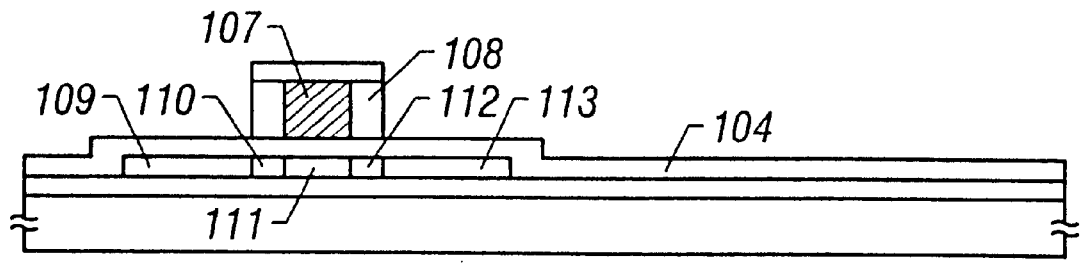
Figure 1D:
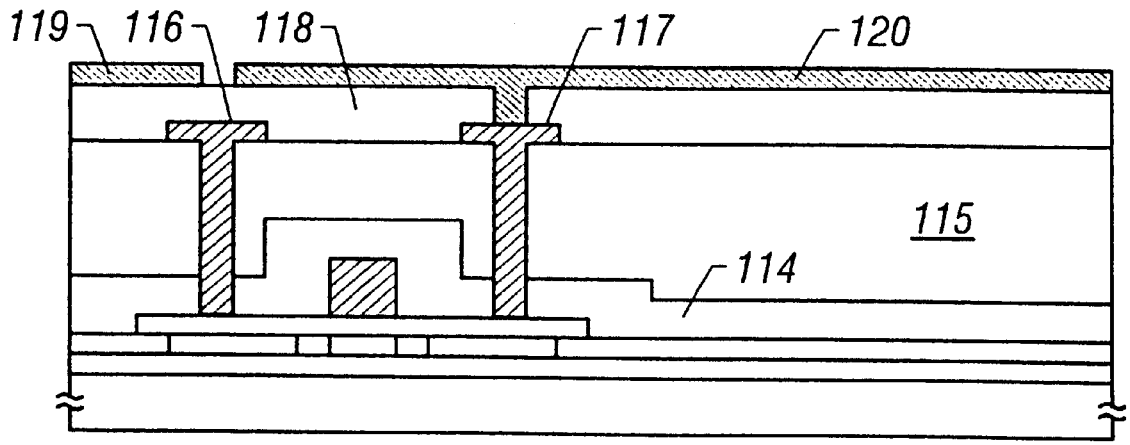

Thus, an aluminum pattern 107 that functions as the gate electrode is obtained as shown in FIG. 1C. In this state, doping of impurities that give one conductivity is conducted through the plasma doping method. In this example, doping of P (phosphorus) is conducted to manufacture an n-channel thin-film transistor.

In this doping process, a source region 109 and a drain region 113 are formed in a self-alignment manner.

In this example, regions 110 and 112 are formed into high-resistant regions which are called offset gate regions. Also, a region 111 is formed into a channel region.

Thus, a state shown in FIG. 1C is obtained. Thereafter, a silicon nitride film 114 is formed in thickness of 2000 Å as a first interlayer insulating film by the plasma CVD method, and also a polyimide resin film 115 is formed on the silicon nitride film 114.

Subsequently, contact holes are formed to form a source electrode (a part of a source line) 116 and a drain electrode 117 which are formed of a multilayer film consisting of a titanium film, an aluminum film and a titanium film.

Thereafter, a polyimide resin film 118 is formed as a second interlayer insulating film on the polyimide resin film 115, and then after contact holes are formed, an aluminum film is formed in thickness of 3000 Å by the sputtering method.

Conditions under which the films are formed are stated below.

target: aluminum target containing scandium of 0.18 wt % therein
film forming pressure: 0.26 Pa
RF power: 2000 W (13.56 MHz)
film thickness: 3000 Å
film forming time: 9.36 minutes In this example, an argon gas containing air of 1% with humidity of 50% is employed as a sputtering gas. During sputtering, a substrate is heated at 150° C. by a resistant heating heater.

A sputtering device as used is a normal high-frequency magnetron type sputtering device to which a gas supply system is added.

In the case where the aluminum film is formed by the sputtering as in this embodiment, aluminum grains are deposited so that the surface of the aluminum film as obtained has irregularities. Then, an incident light is irregularly reflected on the rough surface of the aluminum film so that a white-muddy state can be obtained.

After the aluminum film is obtained, it is patterned to obtain pixel electrode patterns 119 and 120. In this example, the pattern 120 is formed into a pixel electrode which is connected to a drain of the thin-film transistor shown. Further, the pattern 119 is a pixel electrode pattern on the left side in the figure.

A result of measuring the state of the surface of the pixel electrode made of aluminum thus obtained through a surface irregularities tester is shown in FIG. 2. The principle of the surface roughness tester is that a probe scans the surface of a sample so that the irregularities of the surface of the sample is detected as a fine movement of the probe and converted into an electric signal, thus measuring the irregularities of the surface of the sample.

As is apparent from FIG. 2, the surface of the aluminum film thus obtained has proper irregularities to obtain a visually uniform white-muddy state in relation to the rough surface. Such an aluminum film is ideal as the pixel electrode for the direct-sight type liquid-crystal display unit.

It should be noted that although this embodiment is directed to a case where a top-gate type thin-film transistor is used, a thin-film transistor of another type such as a bottom gate type can be used.

Also, since the importance of the present invention resides in the method of forming the pixel electrode, the present invention disclosed herein may be applied to a simple matrix type instead of the active matrix type as described in this embodiment.

Further, the kinds of liquid crystal employed in the liquid-crystal display unit may be a TN type, an STN type, a ferro-electricity type, a diffusion type, a guest host type or the like.

Second Embodiment

A second embodiment is directed to an example in which conditions in forming an aluminum film that constitutes the pixel electrode described in the first embodiment are changed. In this embodiment, steam is contained in the sputtering atmosphere.

Third Embodiment

Figure 3A:
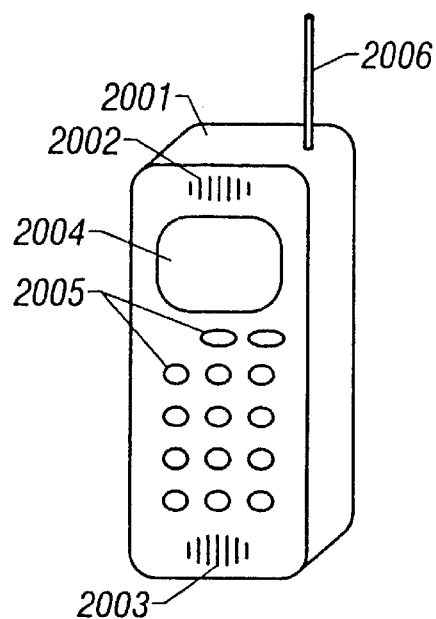
FIGS. 3A to 3C are schematic diagrams showing electronic equipments each having a direct sight type display unit using pixel electrodes of the present invention, respectively, in the third embodiment.
Figure 3B:
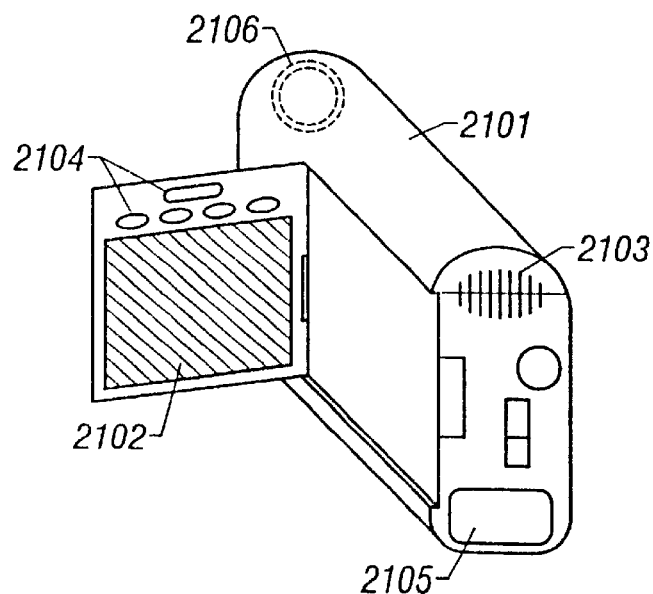
Figure 3C:
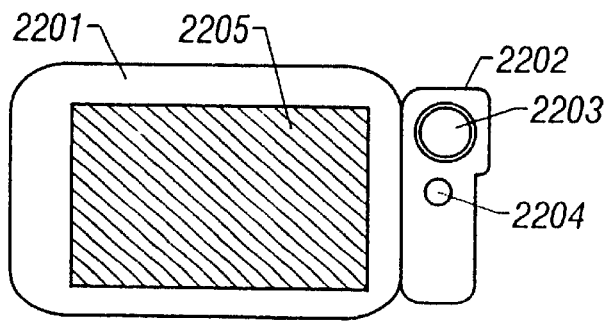
Figure 1A:
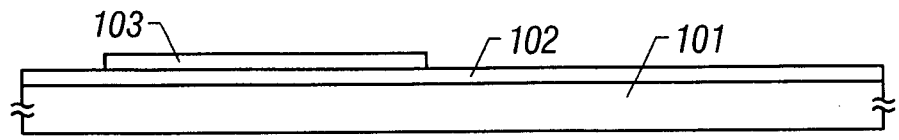
Figure 1B:
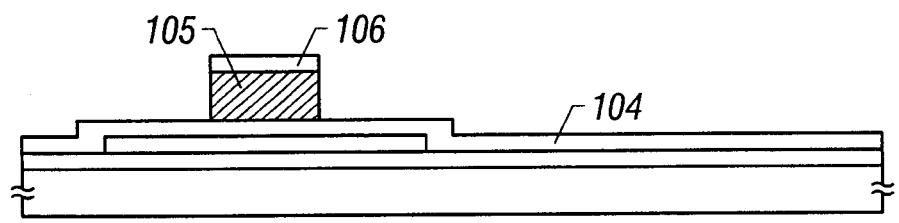
Figure 1C:
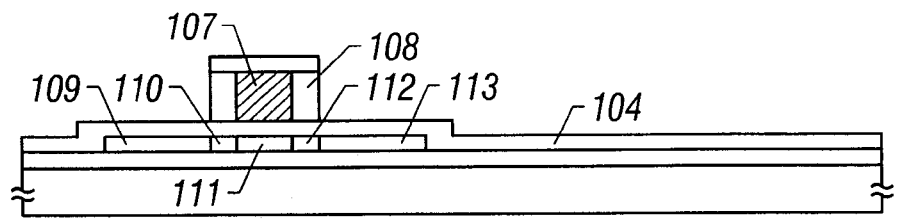
Figure 1D:
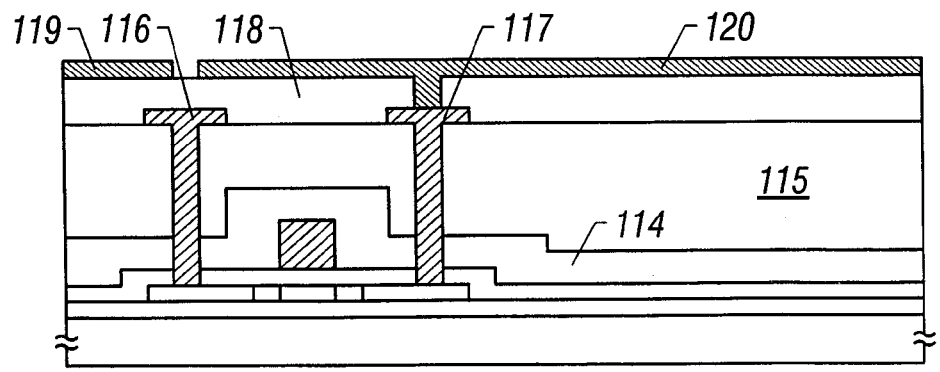

A third embodiment is directed to an example of an electronic device (applied products) having a direct-sight type display unit to which the present invention is applied, which is shown in FIGS. 3A to 3C. It should be noted that the electronic device means a product on which a semiconductor circuit and/or an electro-optic device is mounted.

The electronic devices to which the present invention are applied are a video camera, an electronic still camera, a car navigation, a portable information terminal (mobile computer, a portable telephone, a PHS (a personal handy phone system), etc), a personal computer or the like.

FIG. 3A shows a portable telephone which is made up of a main body, 2001, a voice output section 2002, a voice input section 2003, a direct-sight type display unit 2004, an operation switch 2005, and an antenna 2006. The display unit 2004 includes the pixel electrodes of the present invention.

FIG. 3B shows a video camera which is made up of a main body 2101, a direct-sight type display unit 2102, a voice input section 2103, an operation switch 2104, a battery 2105, and an image receiver 2106. The present invention can be applied to the display unit 2102.

FIG. 3C shows a mobile computer which is made up of a main body 2201, a camera section 2202, an image receiver 2203, an operation switch 2204 and a direct-sight type display unit 2205. The present invention is applicable to the display unit 2205.

Using the pixel electrodes of the present invention, those electronic devices, more particularly the portable information device can be provided inexpensively.

With application of the present invention disclosed herein, a structure where the incident light is irregularly reflected on the surface of the pixel electrode can be obtained in the simpler manner. Also, the present invention can provide the technique by which the direct-sight type of reflection type liquid-crystal display unit can be obtained at the lower costs.

The present specification describes examples in which the present invention is employed mainly to the reflection type active matrix liquid-crystal display unit. However, the present invention described in the present specification is not limited by or to only the applied scope, but can be applied to the manufacture of the electrode which is applied to another use of irregular reflection of the incident light.

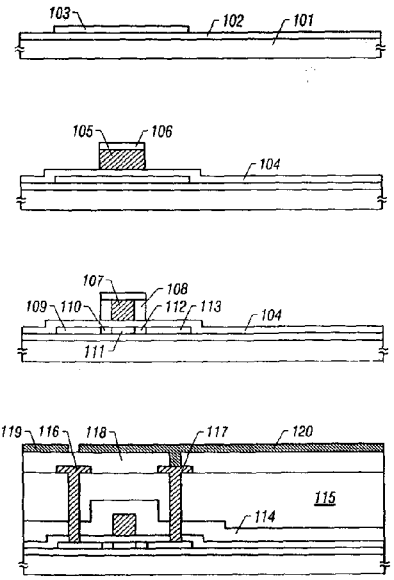

What is claimed is:

1. A method of manufacturing an electronic device comprising at least a reflection type display device, said method comprising the steps of:

forming at least a thin film transistor on an insulating surface, said thin film transistor including a source region, a drain region and a channel region between the source and drain regions;

forming a first interlayer insulating film covering the thin film transistor;

forming a second interlayer insulating film comprising an organic material over the first interlayer insulating film;

forming a film comprising aluminum by sputtering with moisture intentionally induced;

forming a pixel electrode by patterning the film comprising aluminum, said pixel electrode being on the second interlayer insulating film and being electrically connected with the drain region of the thin film transistor, wherein an incident light is reflected on the pixel electrode.

2. A method according to claim 1,
   wherein the first interlayer insulating film comprises a silicon nitride film.

3. A method according to claim 1,
   wherein the second interlayer insulating film comprises a polyimide resin film.

4. A method according to claim 1,
   wherein the electronic device is one selected from the group consisting of a video camera, an electronic still camera, a car navigation, a personal computer, a portable information terminal such as a mobile computer, a portable telephone, a PHS (personal handy phone system).

5. A method according to claim 1,
wherein the thin film transistor is one selected from the group consisting of a top gate type thin film transistor and a bottom gate type thin film transistor.

6. A method of manufacturing an electronic device comprising at least a reflection type display device, said method comprising the steps of:
forming at least a thin film transistor on an insulating surface, said thin film transistor including a source region, a drain region and a channel region between the source and drain regions;
forming a first interlayer insulating film covering the thin film transistor;
forming a first organic resin film on the first interlayer insulating film;
forming a source electrode on the first organic resin film, said source electrode being connected with the source region of the thin film transistor;
forming a drain electrode on the first organic resin film, said drain electrode being connected with the drain region of the thin film transistor;
forming a second organic resin film on the first organic resin film;
forming a film comprising aluminum by sputtering with moisture intentionally induced;
forming a pixel electrode by patterning the film comprising aluminum, said pixel electrode being on the second interlayer insulating film and being electrically connected with the drain electrode,
wherein an incident light is reflected on the pixel electrode.

7. A method according to claim 6,
wherein the first interlayer insulating film comprises a silicon nitride film.

8. A method according to claim 6,
wherein each of the second organic resin films comprise a polyimide resin film.

9. A device according to claim 6,
wherein the electronic device is one selected from the group consisting of a video camera, an electronic still camera, a car navigation, a personal computer, a portable information terminal such as a mobile computer, a portable telephone, a PHS (personal handy phone system).

10. A device according to claim 6,
wherein the thin film transistor is one selected from the group consisting of a top gate type thin film transistor and a bottom gate type thin film transistor.

11. A method of manufacturing an electronic device comprising at least a reflection type display device, said method comprising the step of:
forming a pixel electrode comprising aluminum over an insulating surface by sputtering with moisture intentionally induced,
wherein an incident light is reflected on the pixel electrode.

12. A method according to claim 11, further comprising the step of:
forming at least a thin film transistor being formed over the insulating surface,
wherein the thin film transistor including a source region, a drain region and a channel region between the source and drain regions,
wherein the thin film transistor is one selected from the group consisting of a top gate type thin film transistor and a bottom gate type thin film transistor.

13. A device according to claim 11,
wherein the electronic device is one selected from the group consisting of a video camera, an electronic still camera, a car navigation, a personal computer, a portable information terminal such as a mobile computer, a portable telephone, and a personal handy phone system.

14. A method of manufacturing a reflection type display device comprising:
providing a substrate; and
forming a reflective electrode over the substrate by sputtering in a gas,
wherein moisture is intentionally added to the gas to provide the reflective electrode with an irregular surface.

15. The method according to claim 14 wherein said reflective electrode comprises aluminum.

16. The method according to claim 14 wherein the moisture is added by introducing air into the gas.

17. The method according to claim 14 wherein said device is a liquid crystal device.

18. The method according to claim 14 wherein said device is at least one selected from the group consisting of a video camera, an electronic still camera, a car navigation, a personal computer, a portable information terminal, a portable telephone and a personal handy phone system.

19. A method of manufacturing a reflection type display device comprising:
providing a substrate; and
forming a reflection type display electrode over the substrate by sputtering in a gas,
wherein moisture is intentionally added to the gas during the formation of the electrode.

20. The method according to claim 19 wherein said reflective electrode comprises aluminum.

21. The method according to claim 19 wherein the moisture is added by introducing air into the gas.

22. The method according to claim 19 wherein said device is a liquid crystal device.

23. The method according to claim 19 wherein said device is at least one selected from the group consisting of a video camera, an electronic still camera, a car navigation, a personal computer, a portable information terminal, a portable telephone and a personal handy phone system.

24. A method of manufacturing a reflection type display device comprising:
providing a Substrate; and
forming a reflective electrode over the substrate by sputtering in a gas,
wherein oxygen is intentionally added to the gas to provide the reflective electrode with an irregular surface.

25. The method according to claim 24 wherein said reflective electrode comprises aluminum.

26. The method according to claim 24 wherein the oxygen is added by introducing air into the gas.

27. The method according to claim 24 wherein said device is a liquid crystal device.

28. The method according to claim 24 wherein said device is at least one selected from the group consisting of a video camera, an electronic still camera, a car navigation, a personal computer, a portable information terminal, a portable telephone and a personal handy phone system.

* * * * *

UNITED STATES PATENT AND TRADEMARK OFFICE
CERTIFICATE OF CORRECTION

PATENT NO.    : 6,508,686 B2
DATED         : January 21, 2003
INVENTOR(S)   : Hiroki Adachi It is certified that error appears in the above-identified patent and that said Letters Patent is hereby corrected as shown below:

The title page, showing an illustrative figures, should be deleted and substitute therefore the attached title page.

Delete drawing sheet 1 of 3, and substitute therefore the Drawing sheet, consisting of Figures 1-3, as shown on the attached page.

Signed and Sealed this

Third Day of June, 2003

JAMES E. ROGAN
*Director of the United States Patent and Trademark Office*

United States Patent
Adachi

(10) Patent No.: US 6,508,686 B2
(45) Date of Patent: *Jan. 21, 2003

(54) METHOD OF MANUFACTURING PIXEL ELECTRODE FOR REFLECTION TYPE DISPLAY DEVICE

(75) Inventor: Hiroki Adachi, Kanagawa (JP)

(73) Assignee: Semiconductor Energy Laboratory Co., Ltd., Kanagawa-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/870,868

(22) Filed: May 30, 2001

(65) Prior Publication Data

US 2001/0029144 A1 Oct. 11, 2001

Related U.S. Application Data

(63) Continuation of application No. 09/469,984, filed on Dec. 21, 1999, now Pat. No. 6,243,153, which is a continuation of application No. 08/951,954, filed on Oct. 17, 1997, now Pat. No. 6,056,614.

(30) Foreign Application Priority Data

Nov. 6, 1996 (JP) .................................. 8-310032

(51) Int. Cl.$^7$ .................................. H05B 33/10
(52) U.S. Cl. .................. 445/24; 314/113; 349/139
(58) Field of Search .................. 445/24; 314/113; 349/139

(56) References Cited

U.S. PATENT DOCUMENTS

| | | | | |
|---|---|---|---|---|
| 4,431,272 A | * | 2/1984 | Yazawa et al. | 349/113 |
| 4,648,691 A | * | 3/1987 | Oguchi et al. | 349/113 |
| 5,193,017 A | | 3/1993 | Iwai et al. | 359/59 |
| 5,579,142 A | | 11/1996 | Sawayama et al. | 359/102 |
| 5,708,486 A | | 1/1998 | Miyawaki et al. | 341/44 |
| 5,736,267 A | * | 4/1998 | Mitsui et al. | 428/702 |
| 5,917,563 A | | 6/1999 | Matsishima | 349/38 |
| 5,940,154 A | | 8/1999 | Ukita et al. | 349/113 |
| 5,986,723 A | | 11/1999 | Nakamura et al. | 349/39 |
| 6,018,379 A | | 1/2000 | Mizobata et al. | 349/112 |
| 6,056,614 A | * | 5/2000 | Adachi | 349/113 |
| 6,072,454 A | * | 6/2000 | Natai et al. | 349/41 |
| 6,088,070 A | * | 7/2000 | Ohtani et al. | 349/44 |

* cited by examiner

Primary Examiner—Kenneth J. Ramsey
(74) Attorney, Agent, or Firm—Fish & Richardson P.C.

(57) ABSTRACT

A process of a pixel electrode of a direct-sight type of reflection type liquid-crystal display device is simplified. A pixel electrode 120 of a reflection type liquid-crystal display device is formed of an aluminum film which is formed by sputtering. In forming the aluminum film, moisture is intentionally contained in atmosphere, and also a sample is heated. With this process, aluminum grains grow so that irregularities of μm order is formed on the surface of the aluminum film. The aluminum film thus formed allows the incident light to be irregularly reflected so that it is in a visually white muddy state. This is suitable to the pixel electrode for the reflection type liquid-crystal display device.

28 Claims, 3 Drawing Sheets